(12) United States Patent
Chud et al.

(10) Patent No.: US 11,860,819 B1
(45) Date of Patent: Jan. 2, 2024

(54) AUTO-GENERATION OF PARTITION KEY

(71) Applicant: Amazon Technologies, Inc., Seattle, WA (US)

(72) Inventors: Andrew Christopher Chud, Seattle, WA (US); Richard Threlkeld, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 159 days.

(21) Appl. No.: 15/637,751

(22) Filed: Jun. 29, 2017

(51) Int. Cl.
*G06F 16/13* (2019.01)
*G06F 21/62* (2013.01)
*G06F 16/27* (2019.01)
*G06F 16/00* (2019.01)

(52) U.S. Cl.
CPC .......... *G06F 16/137* (2019.01); *G06F 16/278* (2019.01); *G06F 21/62* (2013.01); *G06F 16/00* (2019.01)

(58) Field of Classification Search
CPC ...... G06F 16/137; G06F 21/62; G06F 16/278; G06F 16/00
See application file for complete search history.

(56) References Cited

U.S. PATENT DOCUMENTS

| | | | | |
|---|---|---|---|---|
| 5,692,177 A * | 11/1997 | Miller | .................. | G06F 16/9014 |
| 5,745,888 A * | 4/1998 | Bauer | .................... | G06F 16/166 |
| 6,131,192 A * | 10/2000 | Henry | ....................... | G06F 8/61 |
| | | | | 717/175 |
| 7,058,639 B1 * | 6/2006 | Chatterjee | ........... | G06F 16/2255 |
| 7,103,616 B1 * | 9/2006 | Harmer | ................ | G06F 16/9574 |
| 7,203,731 B1 * | 4/2007 | Coates | .................. | G06F 16/184 |
| | | | | 709/214 |
| 7,480,910 B1 * | 1/2009 | Kuwamoto | ........... | G06F 17/212 |
| | | | | 718/102 |
| 7,865,476 B2 * | 1/2011 | Kodama | ................ | G06F 16/176 |
| | | | | 707/674 |
| 8,041,735 B1 * | 10/2011 | Lacapra | ................ | G06F 16/182 |
| | | | | 707/783 |
| 8,607,017 B2 * | 12/2013 | Condict | .................. | G06F 3/067 |
| | | | | 711/170 |
| 8,732,245 B2 * | 5/2014 | Scian | ..................... | H04L 51/216 |
| | | | | 707/739 |
| 8,762,353 B2 * | 6/2014 | Carpentier | .............. | G06F 3/067 |
| | | | | 707/698 |

(Continued)

OTHER PUBLICATIONS

Forman et al., "Finding Similar Files in Large Document Repositories" Aug. 2005, Hewlett-Packard.*

*Primary Examiner* — Irete F Ehichioya
*Assistant Examiner* — Huen Wong
(74) *Attorney, Agent, or Firm* — Davis Wright Tremaine LLP (57) ABSTRACT

A distributed database may comprise a plurality of nodes maintaining a collection of data items indexed by key values. Upon receiving a request to store a data item, a node of the database may be selected based on the node's suitability for storing the data item. The distributed database may generate a key to identify the data item, such that the generated key identifies the data item and comprises information indicative of the selected node. The distributed database may provide the generated key to an application programming interface client in response to the request.

17 Claims, 9 Drawing Sheets

(56) References Cited

U.S. PATENT DOCUMENTS

| | | | | |
|---|---|---|---|---|
| 8,874,842 B1* | 10/2014 | Kimmel | ................ | G06F 3/0688 |
| | | | | 711/114 |
| 8,977,662 B1* | 3/2015 | Hilliar | ................ | G06F 16/185 |
| | | | | 707/829 |
| 8,996,810 B2* | 3/2015 | Liang | ................ | G06F 16/2365 |
| | | | | 711/119 |
| 9,235,621 B2* | 1/2016 | Liang | ................ | G06F 16/24532 |
| 9,270,592 B1* | 2/2016 | Sites | ................ | H04L 45/7453 |
| 9,363,135 B1* | 6/2016 | Merom | ................ | G06Q 50/01 |
| 9,785,413 B2* | 10/2017 | Schuchman | ........... | G06F 8/4441 |
| 10,057,279 B1* | 8/2018 | Balduzzi | ........... | H04L 63/1416 |
| 10,877,931 B1* | 12/2020 | Nadiminti | ........... | G06F 16/1787 |
| 2002/0099798 A1* | 7/2002 | Fedorovsky | ........... | G06Q 30/02 |
| | | | | 709/219 |
| 2004/0083273 A1* | 4/2004 | Madison | ................ | H04L 29/06 |
| | | | | 709/217 |
| 2004/0215718 A1* | 10/2004 | Kazmi | ................ | H04L 65/4084 |
| | | | | 709/203 |
| 2004/0230903 A1* | 11/2004 | Elza | ................ | G06F 17/2241 |
| | | | | 715/234 |
| 2006/0150247 A1* | 7/2006 | Gafken | ................ | G06F 21/6281 |
| | | | | 726/17 |
| 2009/0077099 A1* | 3/2009 | Haustein | ............. | H04L 67/1097 |
| 2009/0157549 A1* | 6/2009 | Symons | ................ | G06Q 20/32 |
| | | | | 705/44 |
| 2010/0281178 A1* | 11/2010 | Sullivan | ................ | H04N 7/24 |
| | | | | 709/231 |
| 2011/0007901 A1* | 1/2011 | Ikeda | ................ | H04B 5/02 |
| | | | | 380/270 |
| 2011/0145638 A1* | 6/2011 | Syrgabekov | ......... | H04L 1/0041 |
| | | | | 714/20 |
| 2011/0231660 A1* | 9/2011 | Kanungo | ........... | H04L 63/0435 |
| | | | | 713/168 |
| 2011/0276543 A1* | 11/2011 | Matze | ................ | G06F 3/0608 |
| | | | | 707/692 |
| 2012/0011501 A1* | 1/2012 | Filali-Adib | ........ | G06F 9/45558 |
| | | | | 718/1 |
| 2012/0066229 A1* | 3/2012 | Carter | ................ | G06F 16/137 |
| | | | | 707/747 |
| 2012/0102009 A1* | 4/2012 | Peterson | ................ | G06F 16/10 |
| | | | | 707/705 |
| 2012/0331108 A1* | 12/2012 | Ferdowsi | ................ | H04L 67/06 |
| | | | | 709/219 |
| 2013/0085999 A1* | 4/2013 | Tung | ................ | G06F 11/1451 |
| | | | | 707/654 |
| 2013/0110903 A1* | 5/2013 | Myerscough | ........... | H04L 67/06 |
| | | | | 709/203 |
| 2013/0145099 A1* | 6/2013 | Liu | ................ | H04L 67/2842 |
| | | | | 711/133 |
| 2013/0238730 A1* | 9/2013 | Nir | ................ | H04L 51/08 |
| | | | | 709/206 |
| 2014/0081920 A1* | 3/2014 | Itasaki | ................ | G06F 11/1458 |
| | | | | 707/654 |
| 2014/0108590 A1* | 4/2014 | Hunt | ................ | G06F 8/63 |
| | | | | 709/217 |
| 2014/0258349 A1* | 9/2014 | Meltzer | ................ | G06F 16/183 |
| | | | | 707/827 |
| 2015/0169716 A1* | 6/2015 | Franklin | ................ | G06F 16/27 |
| | | | | 707/610 |
| 2015/0269203 A1* | 9/2015 | Baldwin | ............. | G06F 16/2228 |
| | | | | 707/741 |
| 2016/0063008 A1* | 3/2016 | Benight | ................ | G06F 16/164 |
| | | | | 707/694 |
| 2016/0110292 A1* | 4/2016 | Choi | ................ | G06F 16/9014 |
| | | | | 711/103 |
| 2016/0292042 A1* | 10/2016 | Hu | ................ | G06F 11/1469 |
| 2016/0314315 A1* | 10/2016 | Krogius | ................ | G06F 21/577 |
| 2018/0268141 A1* | 9/2018 | Hagen | ................ | G06F 16/137 |

\* cited by examiner

AUTO-GENERATION OF PARTITION KEY

BACKGROUND

Distributed databases are increasingly used to manage data. A distributed database typically comprises a number of nodes, each of which manages a portion of a collection of data. By adding additional nodes, the distributed database may be adapted to maintain larger collections of data or to handle increased amounts of workload.

Data in distributed databases may be organized as collections of what are sometimes referred to as key-value pairs. The "value" in a key-value pair may refer to a data item, such as information describing a customer or sales record. The "key" refers to a value which identifies the data item, such as a customer identifier or a sales transaction number.

A distributed database may use the key of the key-value pair to determine which node is to be used to store the corresponding data item. A hash function, for example, may map a given key to a node. The mapping may be used to determine which node to store the data item on, and to subsequently determine were the stored data item is located. However, there may be instances in which this technique leads to an unbalanced distribution of data between the nodes.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Disclosed herein are systems, methods, and computer program products related to distributed databases. In an embodiment, a distributed database system comprises an application programming interface with a function for storing a data item indexed by key generated to identify a selected database node. The distributed database may, for example, select a node with capacity suitable for storing the data item and then generate a key that corresponds to the selected node. The generated key, in an embodiment, is then provided via an application programming interface to the application that invoked the interface for storing the data item. The application programming interface may further comprise a function for retrieving the stored data item using the generated key.

In an embodiment, a system comprises a hardware processor and a memory on which machine-readable instructions may be stored. The processor, as a result of performing the instructions, may cause the system at least to select a node of a distributed database for storing a data item. The system may, in an embodiment, select the node having the most capacity for storing and retrieving data items, relative to other nodes. The processor, as a result of performing the instructions, may further cause the system to at least generate a key to identify the data item, where the generated key also comprises information indicative of the selected node. For example, the generated key may comprise data such that a hash of the key refers to the selected node. The processor, as a result of performing the instructions, may further cause the system to provide the generated key via the application programming interface. In an embodiment, upon receiving a request to retrieve the data item based on the generated key, the processor may, as a result of performing the instructions, determine which node the data item was stored on using the key, and provide access to the stored data item.

In an embodiment, a method of operating a distributed database may comprise selecting, based on a request to store a data item in any of the nodes of a distributed database, a particular node on which to store the data item. The method may further comprise generating a key which identifies the data item and which comprises information that is indicative of the selected node. The method may further comprise providing the generated key in response to the request.

In an embodiment, a hash function is used, in both get operations and put operations, to identify the node of a distributed database. In the case of the put operation, where a data item is to be stored by the distributed database, the hash function is applied to a key to determine where a corresponding data item is to be stored. In the case of a get operation, the hash key is applied to a key to determine where the corresponding data item has been stored, so that the data item may be retrieved.

In an embodiment, the same hash function is used for keys supplied as a parameter to a put operation and for keys generated automatically and returned from a put operation. The distributed database system may therefore operate without knowing the source of a key.

Figure 1:
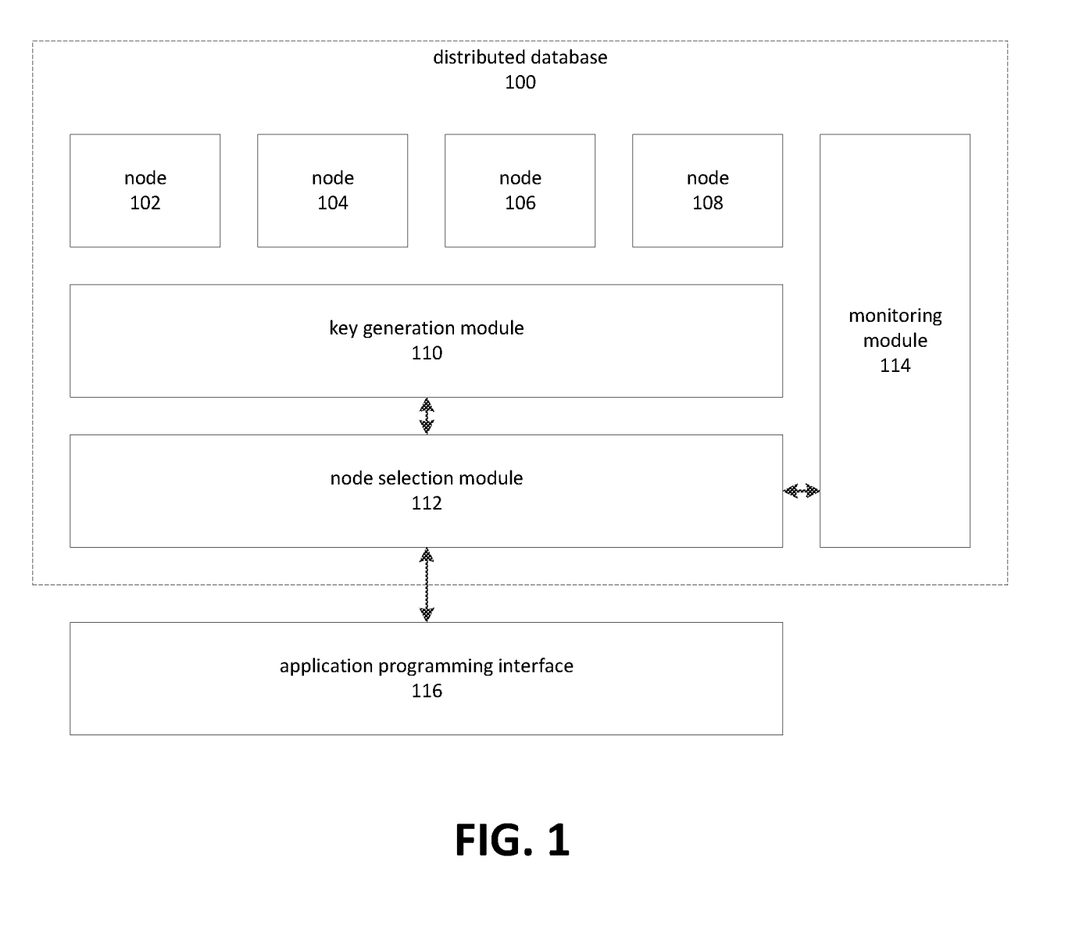
FIG. 1 depicts an embodiment of a distributed database with automatic node selection and key generation.

FIG. 1 depicts an embodiment of a distributed database with automatic node selection and key generation. In an embodiment, a distributed database 100 may comprise a plurality of nodes 102-108. In an embodiment, each of the nodes 102-108 is a computing node configured to maintain a subset of a collection of data. Nodes are sometimes referred to as partitions, because a collection of data may be subdivided, or partitioned, between the nodes 102-108 of the database.

In an embodiment, an application programming interface 116 facilitates interaction with the distributed database 100. Operations facilitated by the application programming interface 116 may include operations to store data, sometimes referred to as "put" or "insert" operations. In an embodiment, the application programming interface 116 may comprise a put function for causing the distributed database to store a data item on one of the nodes 102-108. In some instances, the put function may receive a key value and a data item as parameters. In such instances, the distributed database may select one of the nodes 102-108 for storing the data item based on a hash of the key value. For example, the put function might be supplied with a "customer id" key value and a data item comprising customer information corresponding to the customer id. The customer id might then be hashed and the result of the hash used to select a node for storing the customer information.

In an embodiment, a get operation retrieves data items previously stored using a put operation. In an embodiment, the application programming interface 116 may comprise a get function which accepts a key value as input and returns the data item stored in association with the key. Continuing the previous example, the get function may receive the customer id as a parameter. Applying the hash function to the customer id, the distributed database system may use the resulting value to determine which one of the nodes 102-108 that the corresponding customer information was stored on. Once the node has been determined, the corresponding customer information may be retrieved from the node and provided as a return value of the get function.

In an embodiment, the application programming interface 116 may comprise a put function which accepts a data item as an input parameter and provides, as a return value, an automatically generated key that corresponds to the data item and which may be used in subsequent get operations. This variant of the put function may further comprise the distributed database 100 selecting a node suited for storing the data item, based on factors such as the available read and/or write capacity of the selected node.

In an embodiment, a node selection module 112 may receive information indicating which of the nodes 102-108 may be suitable for storing a data item. In an embodiment, a monitoring module 114 may record usage and/or capacity statistics associated with the nodes 102-108 and provide the information to the node selection module 112. In an embodiment, the node selection module 112 may then identify a node with the greatest capacity for storing data items. For example, the node selection module 112 may determine which of the nodes 102-108 is least populated, and select it for storing a data item.

In an embodiment, a key generation module 110 may receive a request to generate a key that may be used to identify a data item and which further identifies the node selected for storing the data item. As noted, in an embodiment a hash function may be applied to a key in order to identify a node on which a data item may be stored. In an embodiment, the key generation module 110 may perform a converse operation in which a node is first selected and then a key is generated to comprise information mapping to the selected node. For example, the generated key, when hashed, may identify the selected node.

In an embodiment, the nodes 102-108 are computing nodes each configured as a database that maintains a portion of the data maintained by the distributed database 100. In an embodiment, a node 102-108 comprise storage devices on which is stored a portion of the data maintained by the distributed database.

Figure 2:
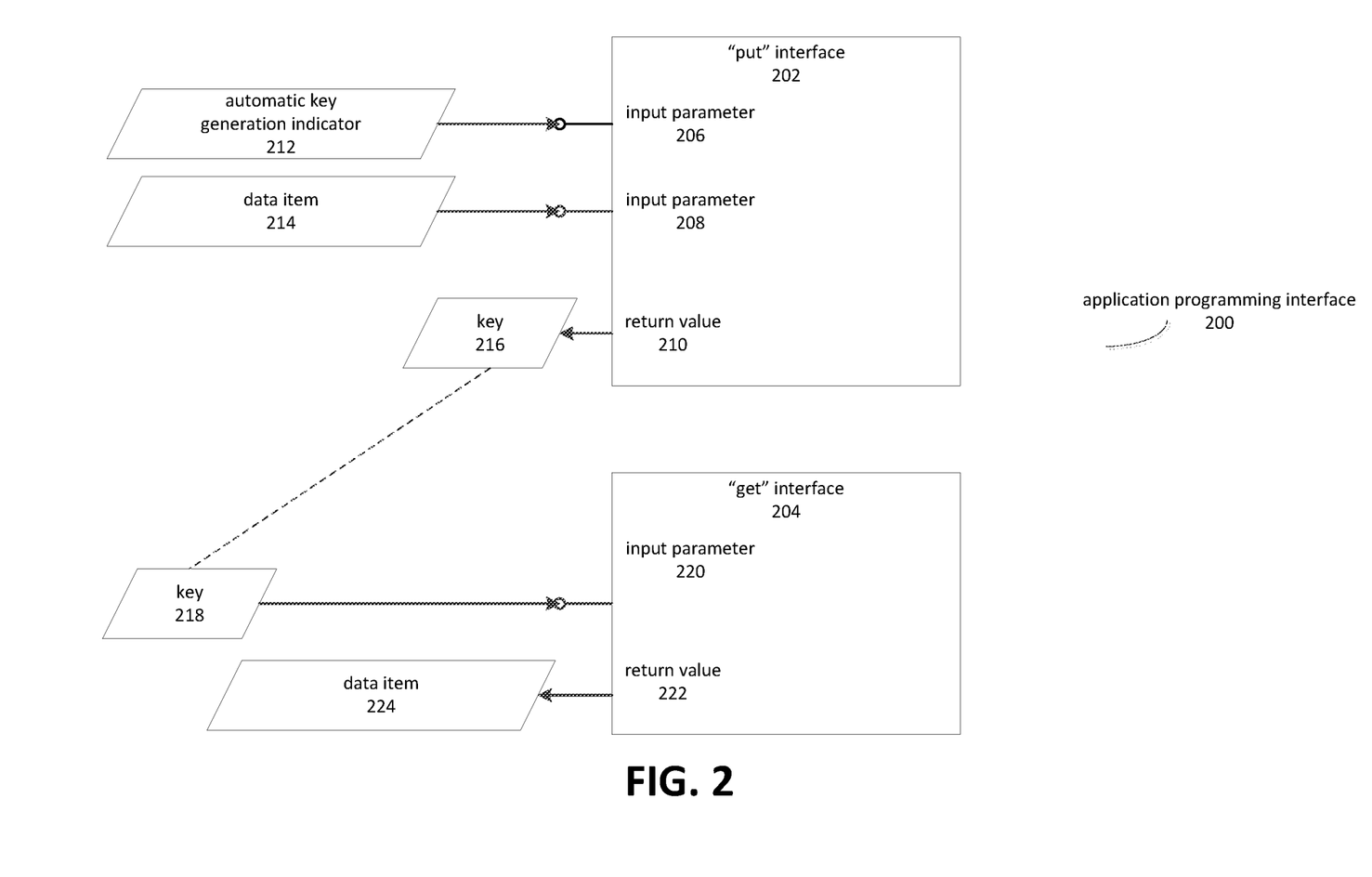
FIG. 2 depicts an embodiment of an application programming interface comprising interfaces for automatic key generation and node selection.

FIG. 2 depicts an embodiment of an application programming interface comprising interfaces for automatic key generation and node selection. In an embodiment, an application programming interface comprises functions, routines, protocols, and/or interfaces for initiating various operations involving a distributed database, such as put and get operations.

In an embodiment, the application programming interface is a component of a distributed database system. In an embodiment, a computing node of the distributed database is configured to receive signals conforming to an interaction protocol.

In an embodiment, the application programming interface is partially located on a client computing device. For example, software routines operative on the client computing device may be activated, and when activated interact with a protocol of a distributed database system to perform the requested operation.

In an embodiment, an application programming interface comprises a put interface 202 and a get interface 204. In an embodiment, an interface comprises a defined means by which two software modules may interact. For example, an interface may conform to a defined means by which an application programming interface 200 and an application program (not depicted) may interact. Although the term interface is sometimes used to refer only to the defined means of interacting, as used herein the term interface may also comprise software instructions which implement the defined means of interaction.

In an embodiment, a put interface 202 may include instructions for receiving input parameters 206-208 and for providing a return value 210. The input parameters 206-208 may comprise an automatic key generation indicator 212 and a data item 214.

In an embodiment, an automatic key generation indicator 212 may comprise a flag or other value indicating that a key should be automatically generated. For example, the put interface 202 may accept string values for the input parameter 206. In some instances, the application invoking the put interface 202 might supply the value of an existing key. If so, the put interface 202 might then cause the corresponding data item to be stored on whatever node was indicated by hashing the supplied key value. However, the client application might instead supply a string value indicating that the key should be automatically generated.

In an embodiment, a client application may supply a pre-defined value, such as "A" or "AUTO-GEN," to indicate that the key should be automatically generated. It will be appreciated that these examples are intended to be illustrative, and should not be construed as limiting the scope of the present disclosure to include only those examples explicitly provided. In an embodiment, procedures used to define or specify data types are used to specify that a key value is to be auto-generated. For example, in an embodiment the distributed database may receive metadata that describes a collection of data that is to be maintained. The metadata may further describe the types of key values, such as strings, integers, and so forth. In an embodiment, the metadata may indicate that the key is to be auto-generated. In an embodiment, the key be specified to be of an auto-generated type, where the distributed database determines what data type is actually used. In an embodiment, the metadata may specify both a type indication and an indication that the key is to be auto-generated.

In an embodiment, a client application may supply data that indicates not only that the key should be generated, but also supplies criteria for selecting a node. For example, a client application might supply values such as CRITERIA=READ_FREQUENCY, and so forth to indicate what criteria should be considered by the system when selecting a node to store a data item. It will be appreciated that these examples are intended to be illustrative, and should not be construed as limiting the scope of the present disclosure to include only those examples explicitly provided.

In an embodiment, the put interface 202 may provide, as a return value 210, a generated key 216. The key 216 may be provided, in an example embodiment, as the return value of a function. In an embodiment, the key 216, 218 may be provided as an output parameter, or some other means. It will be appreciated that these examples are intended to be illustrative, and should not be construed as limiting the scope of the present disclosure to include only those examples explicitly provided.

In an embodiment, the application programming interface may comprise a get interface 204 comprising instructions for receiving an input parameter 220 and for providing a return value 222. As depicted in FIG. 2, a client application may provide a key 218 that corresponds to the key 216, 218 returned by the put interface 202. The get interface 204 may, accordingly, use the key 216, 218 to identify the node on which the data item 214 was stored. The get interface 204 may then provide a copy of the stored data item 214, 224 as a return value 222.

In an embodiment, a hash function used by the put interface 202 is also used by the get interface 204, such that, given the same key 216, 218, the output of the hash function, is consistent between the two interfaces.

Figure 3A:
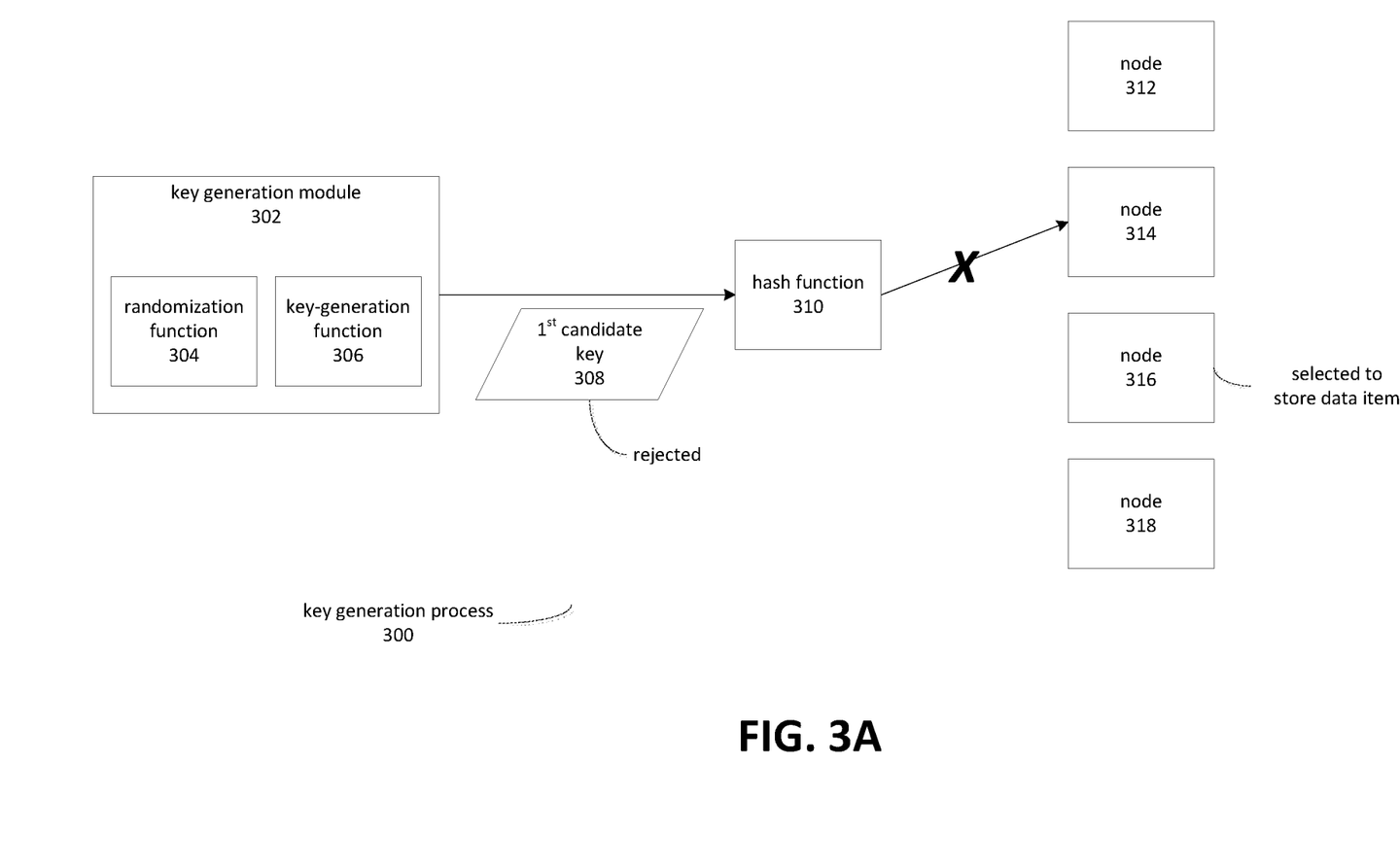
FIGS. 3A and 3B depict an embodiment of a process for generating a key.
Figure 3B:
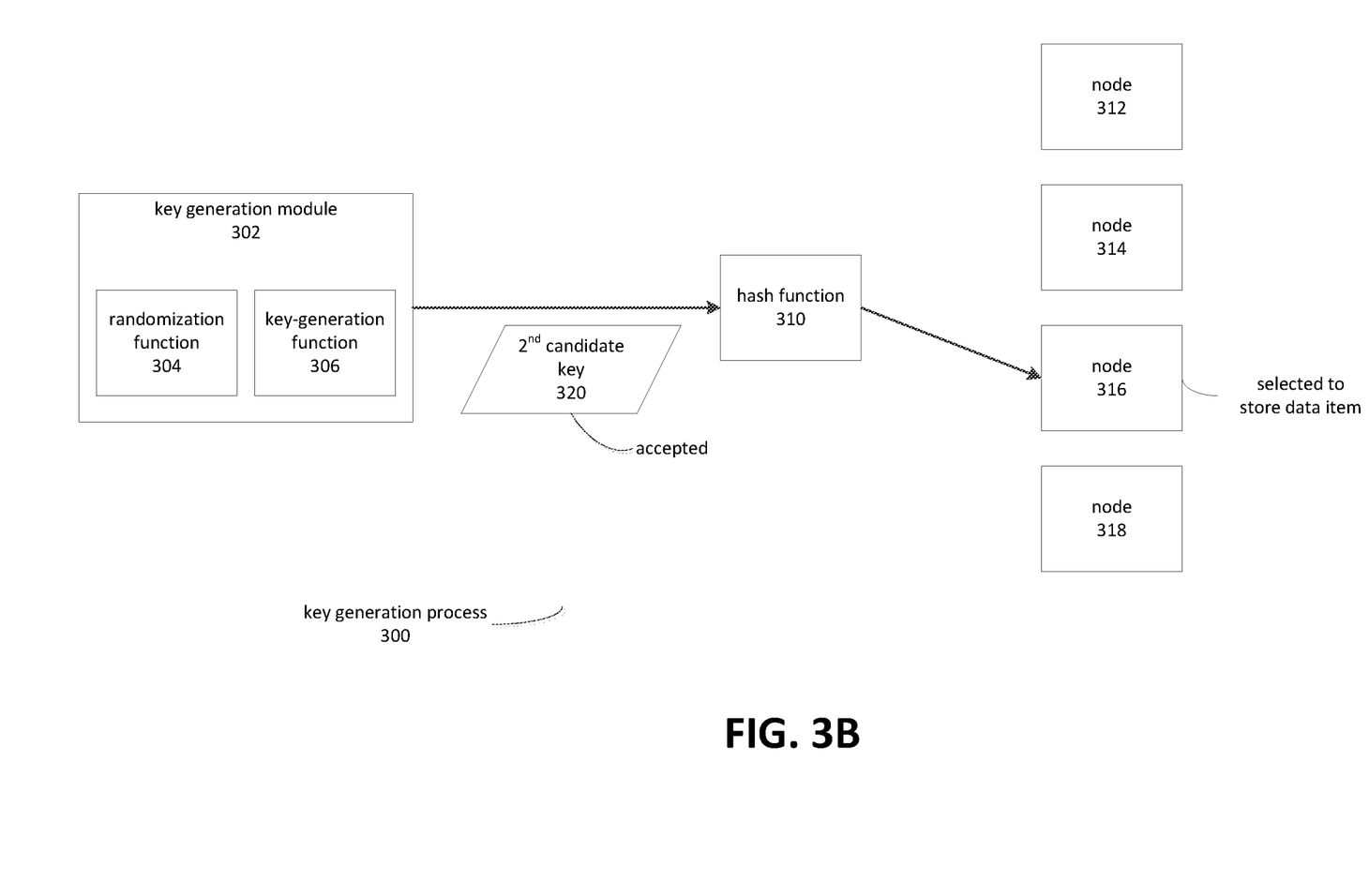

FIGS. 3A and 3B depict an embodiment of a process for generating a key. In an embodiment, a key generation process 300 may be performed by a key generation module 302. The key generation module 302 may iteratively generate candidate keys until a key is determined to comprise information identifying a node selected to store a data item.

In an embodiment, the key generation module 302 may comprise a randomization function 304 and a key-generation function 306. In an embodiment, the randomization function 304 generates random or pseudo-random numbers or strings that may be used by the key-generation function 306 to generate keys. The key-generation function 306, using output of the randomization function 304, produces a candidate key 308 based on the output. In an embodiment, the key-generation function 306 is configured such that it generates candidate keys that, when hashed, refer to nodes 312-318 with a desired random distribution. In an embodiment, the distribution is uniform between all possible nodes 312-318. In an embodiment, the distribution is biased toward a node 316 selected to store the data item. It will be appreciated that these examples are intended to be illustrative, and should not be construed as limiting the scope of the present disclosure to include only those examples explicitly provided.

FIG. 3A depicts that the candidate key 308, when hashed by the hash function 310, refers to a node 314 other than the node 316 selected to store the data item. They key generation process 300 may then proceed, as depicted in FIG. 3B, to produce an additional candidate key 320. The key generation module 302 may then apply the hash function 310 to the candidate key 320 and determine that the candidate key 308 corresponds, as desired, to the node 316 selected to store the data item. The key generation module 302 may then accept the candidate key 320 as the key for the data item, and provided as a return value from the put function.

In an embodiment, the key generation module 302 may accept a key even when it does not correspond to the node 316 selected to store the data item. Instead, the key generation module 302 may employ a randomization function 304 and key-generation function 306 which produces key values that, when hash, are biased towards the selected node 316, but which may at times be randomly generated to point to other nodes. In an embodiment, the key generation module 302 is configured so that it is biased between a plurality of candidate nodes.

Figure 4:
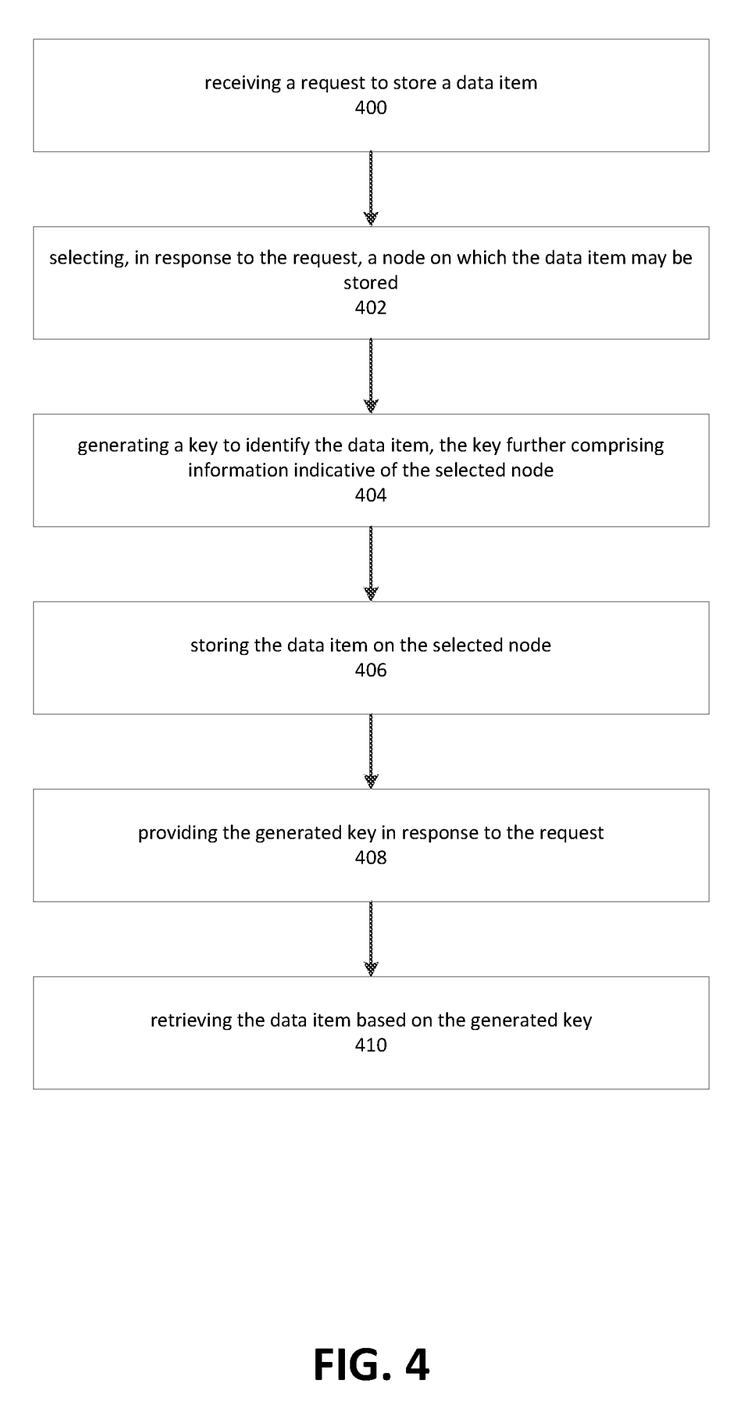
FIG. 4 depicts an embodiment of a process for automatically generating keys in a distributed database.

FIG. 4 depicts an embodiment of a process for automatically generating keys in a distributed database. Although depicted as a sequence of blocks, those of ordinary skill in the art will appreciate that the depicted order should not be construed as limiting the scope of the present disclosure to only embodiments which precisely match the depicted order, and that at least some of the operations referred to in the depicted blocks may be altered, omitted, reordered, supplemented with additional operations, or performed in parallel.

Block 400 depicts an embodiment receiving a request to store a data item. In an embodiment, an application interface comprising a put interface may be provided. The put interface, upon invocation, may cause execution of machine-readable instructions which cause a distributed database to store the data item on a selected node.

In an embodiment, the put interface may comprise input parameters which may be used to indicate that a key should be automatically generated for the data item that is to be stored. In an embodiment, the put interface comprises a flag parameter indicative of using an automatically generated key.

Block 402 depicts an embodiment selecting, in response to the request, a node on which the data item may be stored. In an embodiment, the application programming interface, or another component of the distributed database, determines that a node has greater capacity to store the data item than at least one other node of the plurality of nodes. In an embodiment, the application programming interface, or another component of the distributed database, determines that a node has greater capacity to retrieve the data item than at least one other node. A node may therefore be selected based on its read capacity and/or its write capacity. The selected node may be the node with the greatest read capacity and/or write capacity, or a node with relatively good read capacity and/or write capacity compared to other nodes.

Block 404 depicts an embodiment generating a key to identify the data item and which comprises information indicative of the node selected for storing the data item. In an embodiment, the key is generated based at least in part on a randomization function, and used for identifying the data item based on a determination that a hash of the key identifies the selected node.

In an embodiment, a candidate key is generated based on a randomization function and rejected upon determining that the candidate key does not identify the selected node.

In an embodiment, a candidate key is generated based on a randomization function and rejected upon determining that the candidate key corresponds to a second data item that has already been stored in the distributed database.

In an embodiment, the candidate key is selected based on a randomization function that is biased towards the selected node. In this instance, a key may be accepted for identifying the data item even if the key, when hashed, does not correspond to the initially selected node. In this instance, the node indicated by the candidate key may be used as the selected node.

Block 406 depicts an embodiment storing the data item on the selected node. This may typically comprise writing the data item to a storage device and updating one or more indexes. The indexes may be updated to map from the generated key to the data item.

Block 408 depicts an embodiment providing the generated key in response to the request. In an embodiment, the generated key may be returned to the application that invoked the put interface, so that the application may subsequently refer to the paired key and data item.

Block 410 depicts that, in an embodiment, subsequent requests to retrieve the item may be based on the generated key. Upon receiving a request to retrieve a data item, the distributed database may determine which node the data item is stored on by applying a hash function to the key. That node may then be instructed to retrieve the data item, and the data item provided in response to the request.

Figure 5:
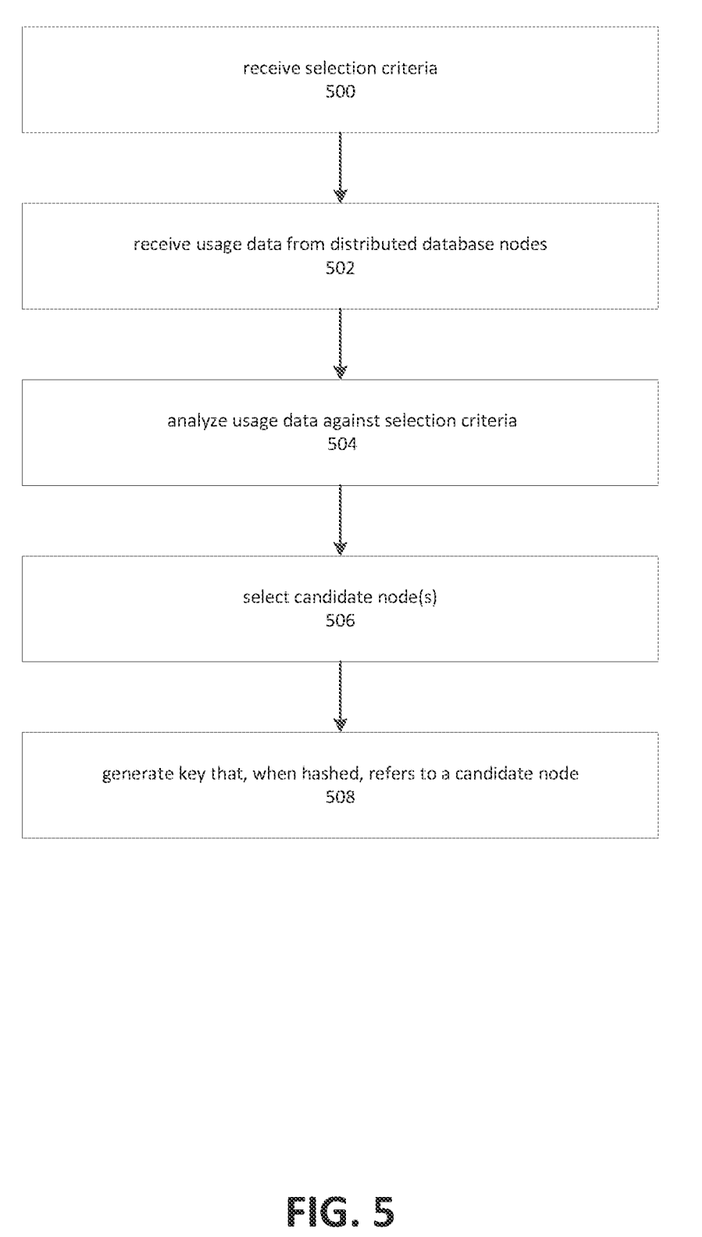
FIG. 5 depicts an embodiment of a process for identifying a node of a distributed database for storing a data item.

FIG. 5 depicts an embodiment of a process for identifying a node of a distributed database for storing a data item. Although depicted as a sequence of blocks, those of ordinary skill in the art will appreciate that the depicted order should not be construed as limiting the scope of the present disclosure to only embodiments which precisely match the depicted order, and that at least some of the operations referred to in the depicted blocks may be altered, omitted, reordered, supplemented with additional operations, or performed in parallel.

Block 500 depicts an embodiment receiving selection criteria. In an embodiment, the selection criteria may be provided from a user interface. For example, an administrator might indicate, through the user interface, that the workload of the distributed database is expected to be write-heavy, read-heavy, or some combination thereof. In an embodiment, the administrator might indicate that storage capacity should be considered as criteria for selecting a node on which a data item should be stored. It will be appreciated that these examples are intended to be illustrative, and should not be viewed as limiting the scope of the present disclosure to only those examples explicitly described.

Block 502 depicts an embodiment receiving usage data from the nodes of a distributed database. In an embodiment, the usage information includes data indicating amounts of available storage capacity on a node, available processing capacity, amount of read traffic, amount of write traffic, and so forth. It will be appreciated that these examples are intended to be illustrative, and should not be viewed as limiting the scope of the present disclosure to only those examples explicitly described.

Block 504 depicts an embodiment analyzing the usage data with respect to the selection criteria. In an embodiment, a node selection module identifies those nodes of the distributed database which are suitable for storing the data item. In an embodiment, a best-fit analysis is performed with respect to the criteria. In an embodiment, one or more nodes having the greatest amount of a desired capacity, such as storage space or processor utilization, is selected. Block 506 depicts an embodiment selecting one or more candidate nodes to store the data item, based on the analysis of the usage data. In an embodiment, a single node is selected. In another aspect, an embodiment of the node selection module may identify a list of nodes that are suitable for storing the data item.

Block 508 depicts an embodiment generating a key that, when hashed, refers to a candidate node. In the event that a list of candidate nodes was identified, the generated key may refer to any one of the selected candidate nodes. In the event that a single node was identified, the generated key may refer to that node.

Figure 6:
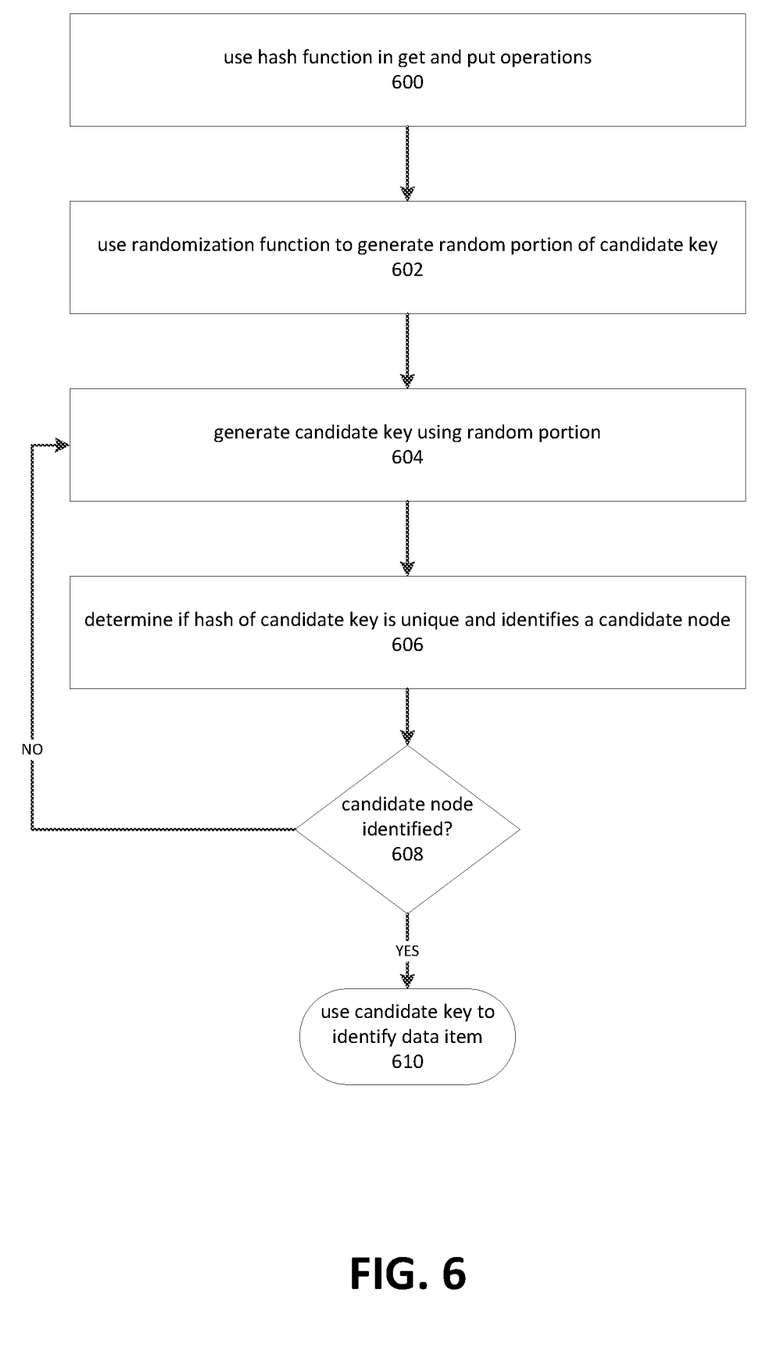
FIG. 6 depicts an embodiment of a process for generating a key comprising information indicative of a selected node.

FIG. 6 depicts an embodiment of a process for generating a key comprising information indicative of a selected node. Although depicted as a sequence of blocks, those of ordinary skill in the art will appreciate that the depicted order should not be construed as limiting the scope of the present disclosure to only embodiments which precisely match the depicted order, and that at least some of the operations referred to in the depicted blocks may be altered, omitted, reordered, supplemented with additional operations, or performed in parallel.

Block 600 depicts an embodiment using a hash function used by the distributed database in get and push operations. In an embodiment, a distributed database comprises N nodes. A selected hash function, in this embodiment, may map from an input string to a numeric value. The numeric value may in turn correspond to one of the N nodes. In this manner, application of the hash function to a key value maps a given key value to one and only one node of the distributed database.

Block 602 depicts an embodiment using a randomization function to generate a random portion of a candidate key. In an embodiment, the random portion constitutes the entire key. In another embodiment, the random portion constitutes a subset of the key. In an embodiment, the randomization and randomized portion of the key are selected so that the output of the hash function randomly refers to one of the N nodes of the distributed database. Block 604 depicts an embodiment generating a candidate key using the randomization function.

Block 606 depicts an embodiment determining if a hash of the candidate key is unique and identifies a candidate node. In an embodiment, a randomly generated key may at times correspond to a data item already stored. In an embodiment, a key generation module may determine if the key has already been used and if so, reject the candidate key. In an embodiment, this operation is performed after determining that the candidate key identifies a selected node. In an embodiment, the operation is combined with other operations, such as storing the data item.

In an embodiment, the key generation module determines if the candidate key identifies one of the candidate nodes. This step may, in an embodiment, comprise applying the hash function to the candidate key and checking to see that the result corresponds to a selected node.

Then, as depicted by branch 608, the process may continue with generating another candidate key at block 604, or using the candidate key to identify a data item at block 610. If the candidate key matches at least one of the candidate nodes, it may be used as the key that will identify the data item.

Figure 7:
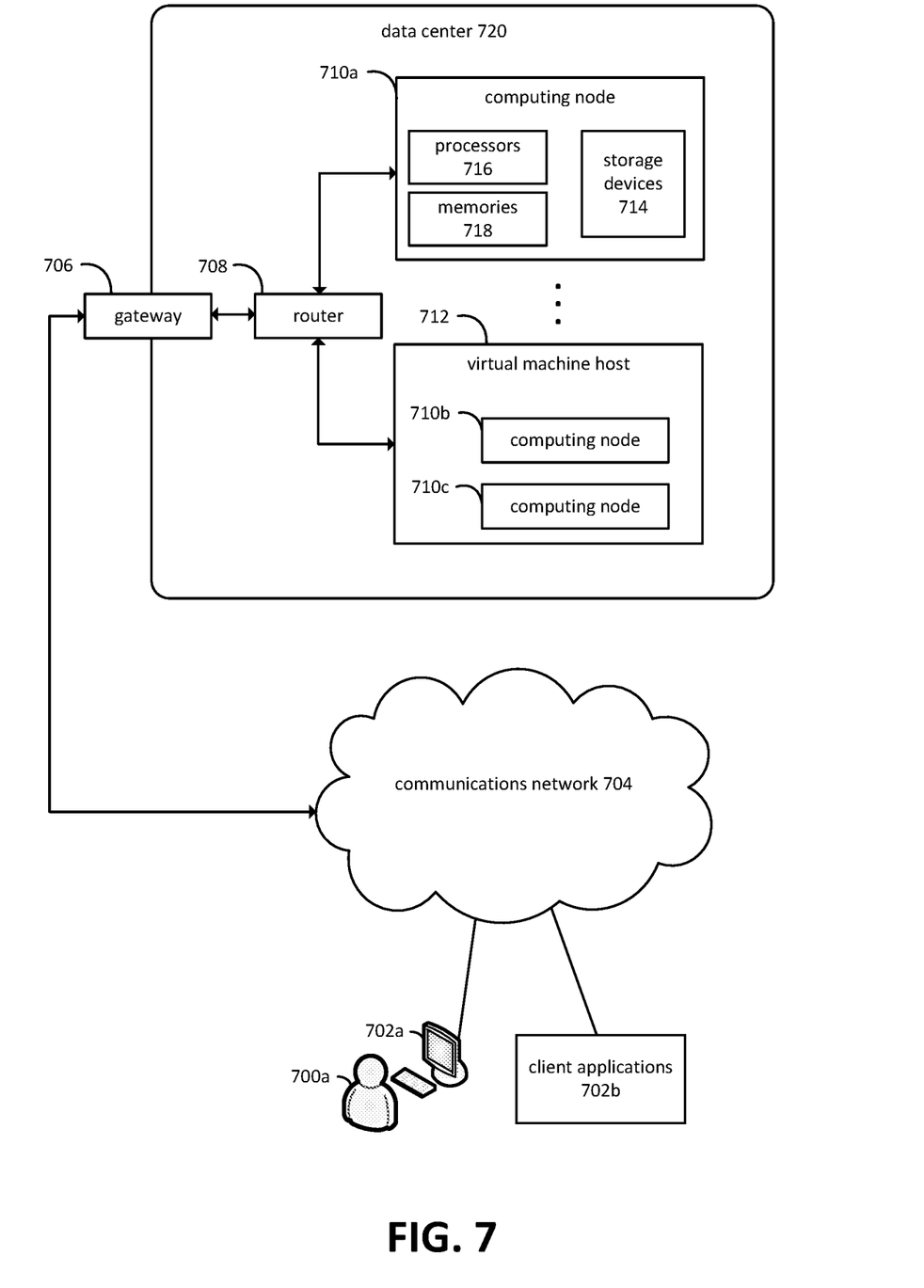
FIG. 7 is a block diagram depicting an embodiment of a computing environment in which aspects of the present disclosure may be practiced.

FIG. 7 is a diagram depicting an example of a distributed computing environment on which aspects of the present invention may be practiced. Various users 700a may interact with various client applications, operating on any type of computing device 702a, to communicate over communications network 804 with processes executing on various computing nodes 710a, 710b, and 710c within a data center 720. Alternatively, client applications 702b may communicate without user intervention. Communications network 704 may comprise any combination of communications technology, including the Internet, wired and wireless local area networks, fiber optic networks, satellite communications, and so forth. Any number of networking protocols may be employed.

Communication with processes executing on the computing nodes 710a, 710b, and 710c, operating within data center 720, may be provided via gateway 706 and router 708. Numerous other network configurations may also be employed. Although not explicitly depicted in FIG. 7, various authentication mechanisms, web service layers, business objects, or other intermediate layers may be provided to mediate communication with the processes executing on computing nodes 710a, 710b, and 710c. Some of these intermediate layers may themselves comprise processes executing on one or more of the computing nodes. Computing nodes 710a, 710b, and 710c, and processes executing thereon, may also communicate with each other via router 708. Alternatively, separate communication paths may be employed. In some embodiments, data center 720 may be configured to communicate with additional data centers, such that the computing nodes and processes executing thereon may communicate with computing nodes and processes operating within other data centers.

Computing node 710*a* is depicted as residing on physical hardware comprising one or more processors 716, one or more memories 818, and one or more storage devices 714. Processes on computing node 710*a* may execute in conjunction with an operating system or alternatively may execute as a bare-metal process that directly interacts with physical resources, such as processors 716, memories 718, or storage devices 714.

Computing nodes 710*b* and 710*c* are depicted as operating on virtual machine host 712, which may provide shared access to various physical resources, such as physical processors, memory, and storage devices. Any number of virtualization mechanisms might be employed to host the computing nodes.

The various computing nodes depicted in FIG. 7 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 8:
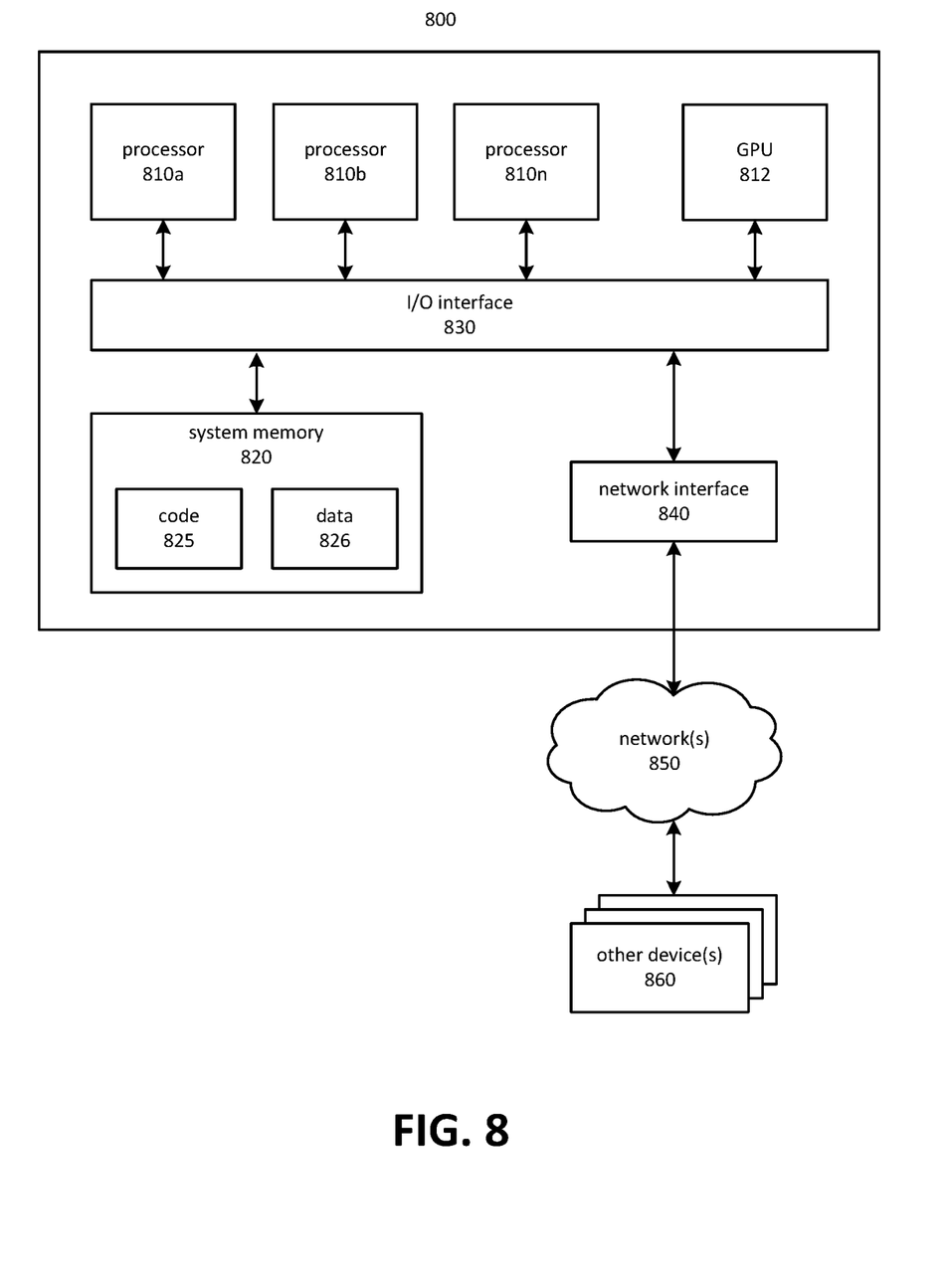
FIG. 8 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. In the illustrated embodiment, computing device 800 includes one or more processors 810*a*, 810*b*, and/or 810*n* (which may be referred herein singularly as a processor 810 or in the plural as the processors 810) coupled to a system memory 820 via an input/output ("I/O") interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures ("ISAs"), such as the x86, PowerPC, SPARC or MIPS ISAs, or any other suitable ISA. In multiprocessor systems, each of processors 810 may commonly, but not necessarily, implement the same ISA.

In some embodiments, a graphics processing unit ("GPU") 812 may participate in providing graphics rendering and/or physics processing capabilities. A GPU may, for example, comprise a highly parallelized processor architecture specialized for graphical computations. In some embodiments, processors 810 and GPU 812 may be implemented as one or more of the same type of device.

System memory 820 may be configured to store instructions and data accessible by processor(s) 910. In various embodiments, system memory 820 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 820 as code 825 and data 826.

In one embodiment, I/O interface 830 may be configured to coordinate I/O traffic between processor 810, system memory 820, and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect ("PCI") bus standard or the Universal Serial Bus ("USB") standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals, such as electrical, electromagnetic or digital signals, conveyed via a communication medium, such as a network and/or a wireless link, such as those that may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

The system memory 820 may be reconfigured by the operation of one or more of the processors 810. The processors 810 may execute the instructions of a code module and thereby reconfigure the system memory 820 to form data structures and data elements. Forming a data element may therefore refer to operations of the processor 810 to reconfigure the system memory 820. The GPU 812, network interface 840, and I/O interface may also, in some cases, form data structures by reconfiguring the system memory 820. Accordingly, the terms "form" and "forming" may also refer to the operations of these and other devices 860 which may cause the a data structure or data element to be stored in the system memory 820.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
a processor; and
a memory to store machine-readable instructions, which as a result of being performed by the processor, cause the system at least to:
  select a node of a distributed database comprising a plurality of nodes, the selection based at least in part on:
    an analysis of usage data from the plurality of nodes of the distributed database compared to selection criteria, and
    a request to store a data item on any one of the plurality of nodes,
    wherein a hash of a key identifying the data item is to map to the selected node,
    wherein the selection of the node is based on a determination that the node has greater capacity to store and read the data item than at least one other node of the plurality of nodes, the at least one other node of the plurality of nodes having a positive non-zero capacity to store the data;
  determine that the selected node has greater capacity to read the data item than at least one other node of the plurality of nodes;
  generate a key to identify the data item by at least iteratively generating candidate keys and a respective hash of the candidate keys until the respective hash identifies the selected node, wherein a first generated candidate key is rejected based at least in part on determining that a hash of the first candidate key identifies a node other than the selected node; and provide the generated candidate key with the respective hash that identifies the selected node in response to the request.

2. The system of claim 1, wherein the memory to store machine-readable instructions, which as a result of being performed by a processor, cause the system at least to:
receive a request to retrieve the data item based on the generated key; and
determine that the data item is stored on the selected node, based at least in part on the hash of the generated key.

3. The system of claim 1, wherein the key is generated based at least in part on a randomization function.

4. The system of claim 1, wherein the memory to store machine-readable instructions, which as a result of being performed by a processor, cause the system at least to:
determine that the selected node has greater capacity to store the data item than at least one other node of the plurality of nodes.

5. The system of claim 1, wherein the request to store the data item comprises information indicative of storing the data item using an automatically generated key.

6. A method, comprising:
selecting, by at least one processor, a node of a plurality of nodes of a distributed database, the selecting based at least in part on a request to store a data item on one of the plurality of nodes, an analysis of usage data from nodes of the distributed database compared to selection criteria, and a determination of:
a respective positive non-zero storage capacity of the plurality of nodes, and
that the selected node of the plurality of nodes has greater capacity to read the data item than at least one other node of the plurality of nodes,
wherein a hash of a key identifying the data item is to map the data item to the selected node;
determining that the selected node has greater capacity to read the data item than at least one other node of the plurality of nodes;
generating, by the at least one processor, a candidate key identifying the data item;
in response to determining that a hash of the candidate key does not map to the selected node, reject the candidate key and iteratively generating a new candidate key and a corresponding hash of the new candidate key until the corresponding hash of the generated new candidate key maps to the selected node; and
providing, by the at least one processor, the generated new candidate key with the corresponding hash that maps to the selected node in response to the request.

7. The method of claim 6, further comprising:
generating, by the at least one processor, the new candidate key based at least in part on a randomization function; and
using the generated key to identify the data item based on determining that the hash of the key identifies the selected node.

8. The method of claim 6, further comprising:
determining, by the at least one processor, that the selected node has greater capacity to store the data item than at least one other node of the plurality of nodes.

9. The method of claim 6, further comprising:
providing, by the at least one processor, an application programming interface for storing the data item, wherein the application programming interface comprises a flag indicative of using an automatically generated key to identify the data item.

10. The method of claim 6, further comprising:
generating, by the at least one processor, the new candidate key based at least in part on a randomization function; and
rejecting, by the at least one processor, the new candidate key based at least in part on determining that the new candidate key corresponds to a second data item.

11. The method of claim 6, further comprising:
generating, by the at least one processor, a new candidate key based at least in part on a randomization function; and
rejecting, by the at least one processor, the new candidate key based at least in part on determining that the hash of the new candidate key refers to a node other than the selected node.

12. A non-transitory storage medium comprising machine-readable instructions that, as a result of being performed by a computing device, cause the computing device to at least:
select a node, of a plurality of nodes of a distributed database, to store a data item, based at least in part on a request to store the data item on any one of the plurality of nodes and on an analysis of usage data from at least one node of the distributed database compared to selection criteria, wherein a result of a hash function applied to a key identifying the data item is to map the key to the selected node, wherein the node is selected based, at least in part, on a determination that the node has greater capacity for storing the data item and reading the data item than at least one other node of the plurality of nodes having less capacity to store and read the data item;
determine that the selected node has greater capacity to read the data item than at least one other node of the plurality of nodes;
generate the key identifying the data item by at least iteratively generating candidate keys and respective hashes of the candidate keys including at least:
determining that a hash of a generated first candidate key does not identify the selected node and rejecting the generated first candidate key with the hash that does not identify the selected node, and
generating a new candidate key and a hash of the new candidate key until the hash of the new candidate key identifies the selected node; and
provide the generated new candidate key with the hash of the new candidate key that identifies the selected node in response to the request.

13. The non-transitory storage medium of claim 12, comprising further machine-readable instructions that, as a result of being performed by the computing device, cause the computing device to at least:
retrieve the data item from the selected node, based at least in part on applying a hash function to the generated key.

14. The non-transitory storage medium of claim 12, comprising further machine-readable instructions that, as a result of being performed by the computing device, cause the computing device to at least:
determine that the generated key corresponds to the selected node, and wherein the key is generated based at least in part on a randomization function.

15. The non-transitory storage medium of claim 12, comprising further machine-readable instructions that, as a result of being performed by the computing device, cause the computing device to at least:
 compare capacity of the node to store data items to another node of the plurality of nodes.

16. The non-transitory storage medium of claim 12, wherein the request is generated by an application programming interface and wherein the generated key is provided as a return value of the application programming interface.

17. The non-transitory storage medium of claim 12, comprising further machine-readable instructions that, as a result of being performed by the computing device, cause the computing device to at least:
 generate the new candidate key based at least in part on a randomization function; and
 reject the new candidate key based at least in part on determining that the hash of the new candidate key refers to a node other than the selected node.

* * * * *